United States Patent
Jung et al.

(10) Patent No.: US 8,804,663 B2
(45) Date of Patent: Aug. 12, 2014

(54) EFFECTIVE METHOD OF HANDOVER IN WIDEBAND RADIO ACCESS SYSTEM

(75) Inventors: In Uk Jung, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 13/147,174

(22) PCT Filed: Feb. 1, 2010

(86) PCT No.: PCT/KR2010/000608
§ 371 (c)(1),
(2), (4) Date: Sep. 1, 2011

(87) PCT Pub. No.: WO2010/087673
PCT Pub. Date: Aug. 5, 2010

(65) Prior Publication Data
US 2011/0310841 A1    Dec. 22, 2011

Related U.S. Application Data

(60) Provisional application No. 61/148,400, filed on Jan. 30, 2009.

(51) Int. Cl.
*H04L 12/28* (2006.01)
*H04W 4/00* (2009.01)

(52) U.S. Cl.
USPC .......................... 370/331; 370/254; 370/328

(58) Field of Classification Search
None
See application file for complete search history.

(56) References Cited

U.S. PATENT DOCUMENTS

| 7,729,288 | B1 | 6/2010 | Betker | |
|---|---|---|---|---|
| 2005/0192011 | A1 | 9/2005 | Hong et al. | |
| 2006/0182041 | A1 | 8/2006 | Graves | |
| 2007/0230400 | A1* | 10/2007 | Kuchibhotla et al. | 370/331 |
| 2008/0159229 | A1 | 7/2008 | Kim | |
| 2009/0111470 | A1* | 4/2009 | Thakare | 455/436 |

(Continued)

FOREIGN PATENT DOCUMENTS

| KR | 10-2008-0108209 | 12/2008 |
|---|---|---|
| WO | 02/093955 | 11/2002 |

(Continued)

OTHER PUBLICATIONS

U.S. Appl. No. 13/540,320, Notice of Allowance dated Jan. 25, 2013, 6 pages.

*Primary Examiner* — Faruk Hamza
*Assistant Examiner* — Diane Lo
(74) *Attorney, Agent, or Firm* — Lee, Hong, Degerman, Kang & Waimey

(57) ABSTRACT

The present invention relates t a wideband radio access system, and more particularly, to a method for enabling adjustment of timing to transmit a handover instruction message and to a mobile terminal capable of performing the method. A method for a terminal handover in a wideband radio access system according to one embodiment of the present invention comprises: receiving from a serving base station a handover command message that contains first timing information indicative of a time for transmitting a first uplink resource allocation information to transmit a handover instruction message; receiving the first uplink allocation information from the serving base station at the timing indicated by the first timing information; and transmitting the handover instruction message to the serving base station through an uplink resource indicated by the first uplink allocation information.

20 Claims, 8 Drawing Sheets

(56) References Cited

U.S. PATENT DOCUMENTS

| | | |
|---|---|---|
| 2009/0131056 A1* | 5/2009 | Bontu et al. ............... 455/436 |
| 2009/0252116 A1* | 10/2009 | von Brandt et al. ......... 370/331 |
| 2009/0279505 A1 | 11/2009 | Baek et al. |
| 2010/0002653 A1 | 1/2010 | Agiwal et al. |
| 2010/0098025 A1 | 4/2010 | Chen et al. |
| 2012/0087338 A1* | 4/2012 | Brandt et al. ............... 370/331 |

FOREIGN PATENT DOCUMENTS

| | | |
|---|---|---|
| WO | 2006/019268 | 2/2006 |
| WO | 2006/107701 | 10/2006 |
| WO | 2007/078043 | 7/2007 |

* cited by examiner

EFFECTIVE METHOD OF HANDOVER IN WIDEBAND RADIO ACCESS SYSTEM

CROSS-REFERENCE TO RELATED APPLICATIONS

This application is the National Stage filing under 35 U.S.C. 371 of International Application No. PCT/KR2010/000608, filed on Feb. 1, 2010, which claims the benefit of U.S. Provisional Application Ser. No. 61/148,400, filed on Jan. 30, 2009.

TECHNICAL FIELD

The present invention relates to a wideband radio access system, and more particularly, to a method capable of adjusting a time point for transmitting a handover indication message.

BACKGROUND ART

In an IEEE 802.16 based radio mobile communication system, handover ranging is basically performed during handover of a Mobile Station (MS) for synchronization with a target Base Station (BS). However, to minimize a handover time, a process for adjusting uplink (UL) synchronization through transmission of a Code Division Multiple Access (CDMA) ranging code may be selectively omitted and a ranging request (RNG-REQ) message may be directly transmitted. This is called fast ranging.

FIG. 1 is a flow chart of a general handover process using fast ranging.

First, an MS transmits a handover request (MOB_MSHO-REQ) message to a Serving Base Station (SBS) (step S110). The SBS transmits a handover request (HO-REQ) to a Target Base Station (TBS) (step S120) and receives a handover response (HO-RSP) from the TBS (step S130).

The SBS informs the MS of a time point, at which a fast ranging information element (Fast_Ranging_IE) of TBSs is transmitted, through action time information of a handover response (MOB_BSHO-RSP) (step S140).

If a time which is not 0 is allocated through an action time field, the MS may perform fast ranging to a TBS after that time. The handover response message may include not only an action time but also information about neighboring BSs which can be handed over.

The MS prepares/determines handover to the TBS using information included in the handover response message and transmits a handover indication (MOB_HO-IND) message to the SBS (step S150).

Next, the MS successfully receives the fast ranging information element (Fast_Ranging_IE) from the TBS at a time point indicated by the action time information to receive UL allocation for transmission of a ranging request (RNG-REQ) message (step S160).

The MS transmits the RNG-REQ message to the TBS (step S170) and receives a ranging response (RNG-RSP) message (step S180) to complete authentication. Then, the MS performs user data communication with the TBS.

Such a fast ranging procedure is carried out while the MS receives necessary ranging parameters through a previous scanning process and a reception process of a neighbor advertisement (MOB_NBR-ADV) message.

To prevent loss of a voice or data packet which may be generated during communication failure caused by handover, the MS, SBS, and TBS perform buffering for UL and/or downlink (DL) data. Thereafter, if handover has been successfully performed, corresponding entities transmit the buffered information and thus normal communication can be continuously performed without losing data. The MS may start such buffering from a time point at which a handover indication message is transmitted to the SBS and the SBS may start buffering from a time point at which the handover indication message is received from the MS.

The above-described handover process is described in terms of a delay time with reference to FIG. 2.

FIG. 2 is a diagram showing a general fast handover procedure in a frame unit in a time axis.

In FIG. 2, each message is transmitted in units of 5 ms and it is assumed that a processing time is one Transmission Time Interval (TTI) (2 ms).

First, an MS may receive a DL synchronization frame in a K-th frame to establish synchronization with a TBS (step S201).

The MS may receive a fast ranging Information Element (IE), which may be a form of an UL MAP, from the TBS at a time point indicated by action time information (step S202).

The MS may transmit a ranging request message using UL MAP information to the TBS and the TBS may transmit a ranging response message to the MS (steps S203 and S204).

The TBS may allocate a Channel Quality Indication Channel (CQICH) to the MS and the MS may transmit a Channel Quality Indicator (CQI) code corresponding to channel quality to the TBS through the allocated channel (steps S205 and S206).

Next, the TBS may allocate a UL resource through a DL MAP to the MS and the MS may transmit data through the allocated UL resource (steps S207 and S208).

According to the initial assumption, a total of 40 ms is delayed through the above-described process.

In a radio communication network conforming to general IEEE 802.16e standard, an MS performing handover informs an SBS of information about a BS to which the MS determines to perform handover through a handover indication message. The BS transmits a handover response message to the MS and next transmits UL grant information for transmission of the handover indication message to the MS at an implicit time point or at a time point at which a handover waiting timer has expired. In this way, in order to transmit the handover indication message, the MS should wait for the UL grant information from the SBS. However, since the MS is not aware of a time point at which the UL grant information is transmitted, the MS may encounter the following problems.

First, the MS cannot accurately know until when information can be exchanged with the SBS. Then it is difficult for the MS to perform efficient handover execution scheduling.

Second, if the MS has not received the UL grant information due to a poor channel state, the MS cannot receive information any longer from the SBS. Hence, an unnecessary handover interruption time may be added.

Third, if the MS has not received the UL grant information, since the MS cannot transmit a handover indication message to the TBS, a handover procedure is delayed. Consequently, an unnecessary handover interruption time is additionally generated.

Disclosure

Technical Problem

An object of the present invention is to provide a more efficient handover execution method.

Another object of the present invention is to provide a handover execution method which can reduce a delay time by efficiently using an action time during handover.

Still another object of the present invention is to provide a method for efficiently adjusting a transmission time point of UL grant information for transmission of a handover indication message.

The technical problems to be solved by the present invention are not limited to the above-mentioned technical problems, and other technical problems not mentioned above can be clearly understood by one skilled in the art from the following description.

Technical Solution

To solve the technical problems, the present invention discloses various communication methods for performing efficient handover.

In an aspect of the present invention, a method for performing handover of a mobile station in a wideband radio access system includes: receiving a handover command message including first time information from a serving base station, wherein the first time information indicates a time point at which first uplink resource allocation information for transmission of a handover indication message is transmitted; receiving the first uplink allocation information from the serving base station at a time point indicated by the first time information; and transmitting the handover indication message to the serving base station through an uplink resource indicated by the first uplink allocation information.

The first time information may be determined in units of frames.

The method may further include receiving second uplink resource allocation information using second time information, wherein the second time information may indicate a cycle at which the second uplink resource allocation information for transmission of the handover indication message is transmitted, wherein the handover command message may further include the second time information, and wherein the transmission of the handover indication message may be performed through an uplink resource indicated by the second uplink resource allocation information.

In another aspect of the present invention, a method for performing handover of a mobile station in a wideband radio access system includes: receiving a handover command message including first time information from a serving base station, wherein the first time information indicates a time point at which uplink grant information including uplink resource allocation information for transmission of a handover indication message is transmitted; requesting the serving base station to transmit the uplink grant information before a time point indicated by the first time information; receiving the uplink grant information from the serving base station as a response to the request of the uplink grant information; and transmitting the handover indication message to the serving base station through an uplink resource indicated by the uplink grant information.

The request of the uplink grant information may be performed through a Medium Access Control (MAC) message or a piggyback header.

The handover command message may further include a ranging code for requesting the uplink grant information, and the request of the uplink grant information may include transmitting the ranging code to the serving base station.

The method may further include receiving a fast ranging information element from a target base station at a time point indicated by action time information, wherein the handover indication message may include the action time information preferred by the mobile station.

In still another aspect of the present invention, a method for performing handover of a base station in a wideband radio access system includes: transmitting a handover command message including first time information to a mobile station, wherein the first time information indicates a time point at which first uplink resource allocation information for transmission of a handover indication message of the mobile station is transmitted; and transmitting the first uplink allocation information to the mobile station at a time point indicated by the first time information.

The first time information may be determined in units of frames.

The method may further include cyclically transmitting second uplink resource allocation information to the mobile station, wherein the handover command message may include second time information indicating a cycle at which the second uplink resource allocation information for transmission of the handover indication message of the mobile station is transmitted.

The transmission of the second uplink resource allocation information may not be performed when it is a time point indicated by the first time information or when the handover indication message is received through a resource indicated by the second uplink resource allocation information.

In a further aspect of the present invention, a method for performing handover of a serving base station in a wideband radio access system includes: transmitting a handover command message including first time information to a mobile station, wherein the first time information indicates a time point at which uplink grant information including uplink resource allocation information for transmission of a handover indication message of the mobile station is transmitted; receiving a request for the uplink grant information from the mobile station before a time point indicated by the first time information; and transmitting the uplink grant information to the mobile station as a response to the request.

The reception of the request may include receiving a Medium Access Control (MAC) message or a piggyback header.

The handover command message may further include a ranging code used by the mobile station to request the uplink grant information, and the reception of the request may include receiving the ranging code from the mobile station.

The method may further include: receiving a handover indication message including action time information preferred by the mobile station; and transmitting the action time information to a target base station.

In a still further aspect of the present invention, a mobile station includes: a processor; and a Radio Frequency (RF) module for transmitting and receiving radio signals to and from the outside according to control of the processor, wherein the processor acquires, through a handover command message received from a serving base station, first time information indicating a time point at which first uplink resource allocation information for transmission of a handover indication message through the RF module is transmitted, and if the first uplink allocation information is received from the serving base station at a time point indicated by the first time information, the processor performs a control function for transmitting the handover indication message to the serving base station through an uplink resource indicated by the first uplink allocation information.

The handover command message may further include second time information indicating a cycle at which second uplink resource allocation information for transmission of the handover indication message is transmitted, and if it is determined to transmit the handover indication message before a time point at which the first uplink resource allocation information is transmitted, the processor may receive the second uplink resource allocation information using the second time information and perform a control function for transmitting the handover indication message to the serving base station through an uplink resource indicated by the second uplink resource allocation information.

If it is determined to transmit the handover indication message before a time point at which the first uplink resource allocation information is transmitted, the processor may request the serving base station to transmit third uplink allocation information for transmission of the handover indication message before the time point indicated by the first time information, and if the third uplink allocation information is received from the serving base station as a response to the request of the third uplink allocation information, the processor may perform a control function for transmitting the handover indication message to the serving base station through an uplink resource indicated by the third uplink allocation information.

The processor may control the request of the third uplink allocation information to be performed through a Medium Access Control (MAC) message or a piggyback header.

The handover command message may further include a ranging code for requesting the third uplink allocation information and the processor may control the request for the third uplink allocation information to be performed through the ranging code.

Advantageous Effect

According to embodiments of the present invention, the following effects are obtained.

First, the embodiments of the present invention enable efficient communication by minimizing an unnecessary handover interruption time.

Second, the embodiments of the present invention enable efficient use of an action time during handover execution.

Third, the embodiments of the present invention enable efficient adjustment of a transmission time point of UL grant information for transmission of a handover indication message.

The effects of the present invention are not limited to the above-mentioned effects, and other effects not mentioned above can be clearly understood by one skilled in the art from the following description.

BEST MODE FOR CARRYING OUT THE INVENTION

Figure 1:
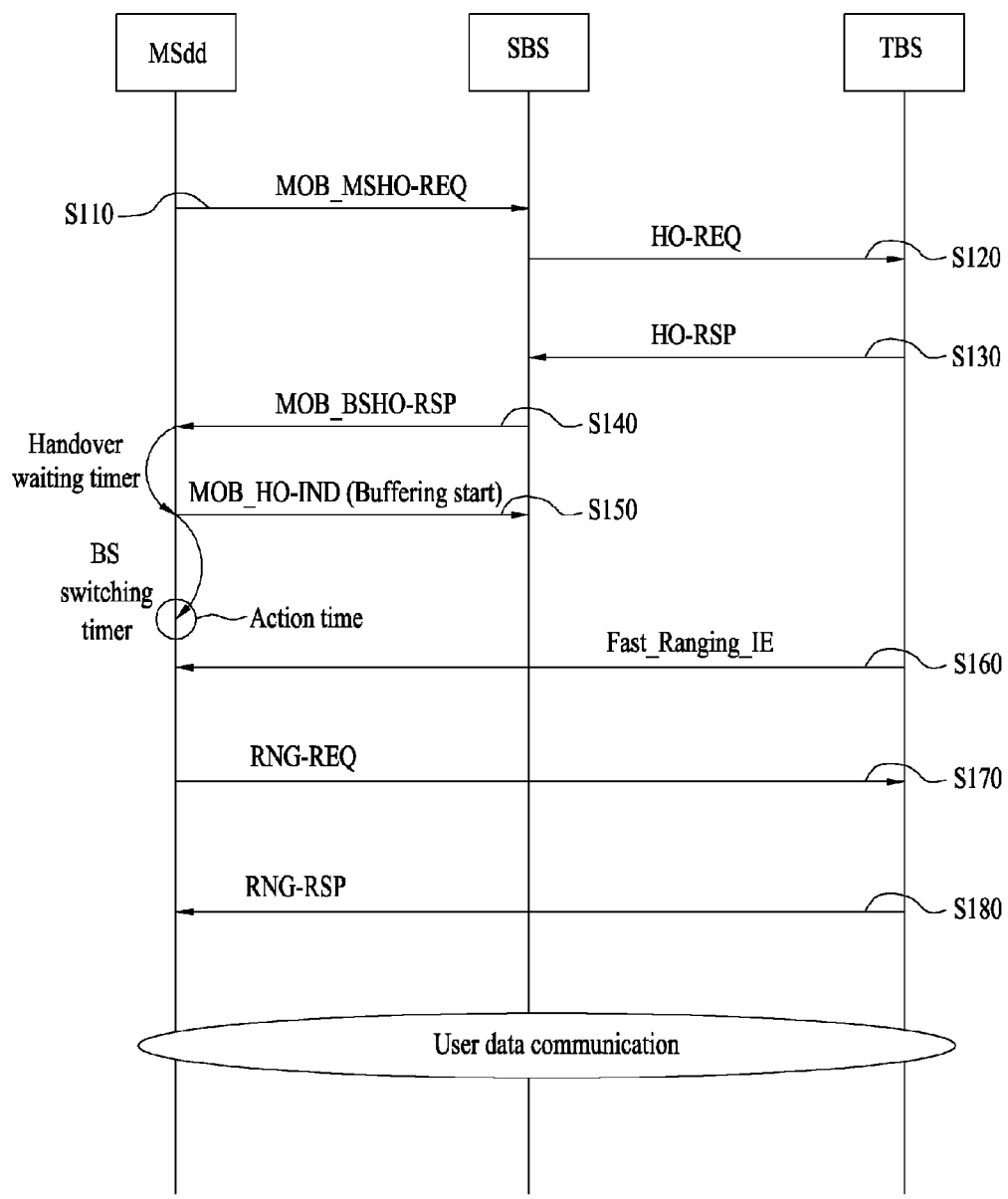
FIG. 1 is a flow chart of a general handover process using fast ranging.
Figure 2:
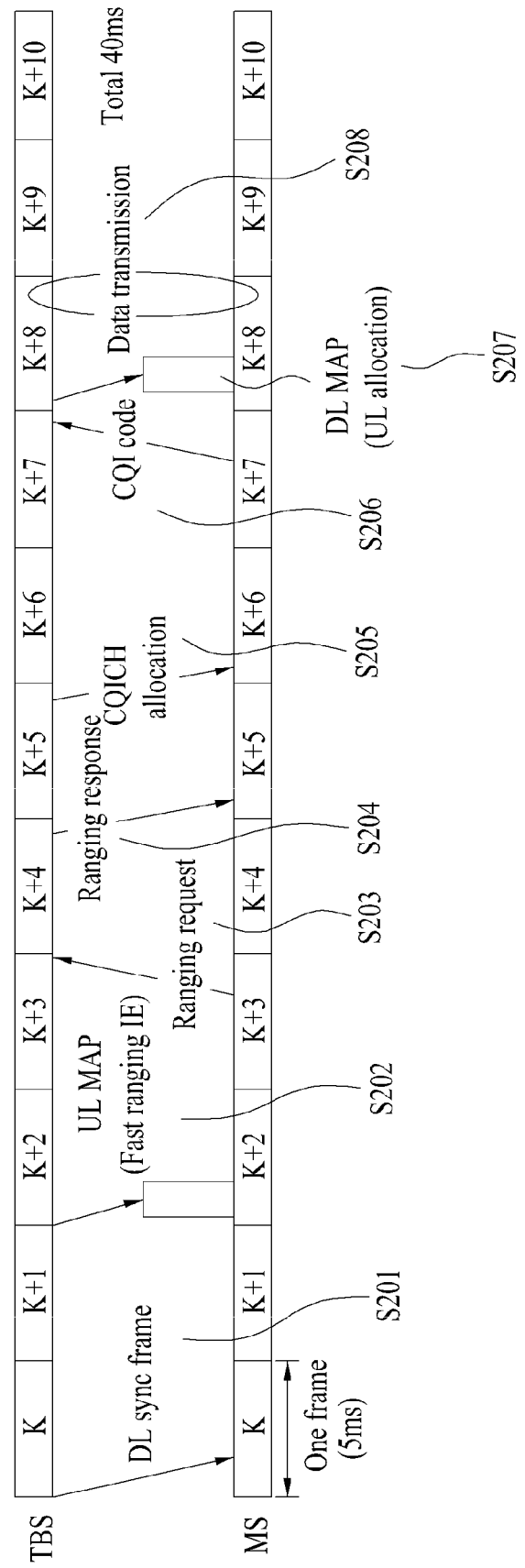
FIG. 2 is a diagram showing a general fast handover procedure in a frame unit in a time axis.

The present invention relates to a radio access system. Hereinbelow, the embodiments of the present invention disclose various methods for efficiently performing handover in the radio access system.

The following embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may obscure the subject matter of the present invention will not be described. Also, procedures or steps that may be understood by a person with ordinary skill in the art will not be described.

The embodiments of the present invention are described based on data transmission and reception between a Base Station (BS) and a Mobile Station (MS). In this case, the BS means a terminal node of a network, which performs direct communication with the MS. A specific operation which is described as being performed by the BS may be performed by an upper node of the BS.

In other words, various operations performed for communication with the MS in a network which includes a plurality of network nodes along with the BS may be performed by the BS or network nodes other than the BS. The 'BS' may be replaced with terms such as fixed station, Node B, eNode B (eNB), and access point. Also, the 'MS' may be replaced with terms such as User Equipment (UE), Subscriber Station (SS), Mobile Subscriber Station (MSS), Mobile Terminal (MT), and terminal.

Furthermore, a transmitter means a fixed and/or mobile node that provides data services or voice services and a receiver means a fixed and/or mobile node that receives data services or voice services. Accordingly, in UL, the MS may be a transmitter and the BS may be a receiver. Likewise, in DL, the MS may be a receiver and the BS may be a transmitter.

Meanwhile, in the present invention, examples of the MS include a Personal Digital Assistant (PDA), a cellular phone, a Personal Communication Service (PCS) phone, a Global System for Mobile (GSM) phone, a Wideband CDMA (WCDMA) phone, and a Mobile Broadband System (MBS) phone. Also, examples of the MS further include a PDA, a hand-held PC, a notebook PC, a smart phone, and a Multi Mode-Multi Band (MM-MB) terminal.

In this case, the smart phone is a terminal combining advantages of a mobile communication terminal and a PDA. The smart phone may mean a terminal in which a schedule management function of a PDA and data communication functions of facsimile transmission/reception, internet access, etc. are integrated. Also, the MM-MB terminal means a terminal having a built-in multi-modem chip to be operable in a portable Internet system and other mobile communication systems (e.g., CDMA 2000 system, WCDMA system, etc.).

The embodiments of the present invention can be implemented by various means, for example, hardware, firmware, software, or combinations thereof.

In case of hardware implementation, a method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In case of firmware or software implementation, the method according to the embodiments of the present invention can be implemented by a type of a module, a procedure, or a function, which performs functions or operations described above. Software code may be stored in a memory unit and then may be executed by a processor. The memory unit may be located inside or outside the processor to transmit and receive data to and from the processor through various well known means.

The embodiments of the present invention can be supported by standard documents disclosed in at least one of wireless access systems, i.e., IEEE 802, 3GPP, 3GPP LTE, and 3GPP2 systems. Namely, among the embodiments of the present invention, steps or parts which are not described to clarify the technical features of the present invention can be supported by the above standard documents. Also, all terminology disclosed herein can be described by the above standard documents. Particularly, the embodiments of the present invention can be supported by one or more of standard documents of IEEE 802.16, i.e., P802.16-2004, P802.16e-2005, and P802.16Rev2.

Hereinafter, the preferred embodiments of the present invention will be described with reference to the accompanying drawings. The detailed description, which will be disclosed along with the accompanying drawings, is intended to describe the exemplary embodiments of the present invention, and is not intended to describe a unique embodiment through which the present invention can be carried out.

Specific terminology used in the embodiments of the present invention are provided to assist in understanding of the present invention, and various modifications can be made to the specific terminology within the range that they do not depart from the technical spirit of the present invention.

In this specification, although the following embodiments are described based on an IEEE 802.16m system, the present invention is not limited thereto and may be applied to various radio communication systems performing handover. Also, although the following embodiments are described based on MS initiated handover, the present invention is applicable to BS initiated handover.

First Embodiment

According to an embodiment of the present invention, a method is provided for informing an MS of a time point at which resource allocation information for transmission of a handover (HO) indication message to an SBS, i.e., UL grant information is transmitted to an MS.

In this embodiment, the SBS may inform the MS of a time point at which UL grant information for transmission of the HO indication message is transmitted through an HO command message. This is described with reference to FIG. 3.

Figure 3:
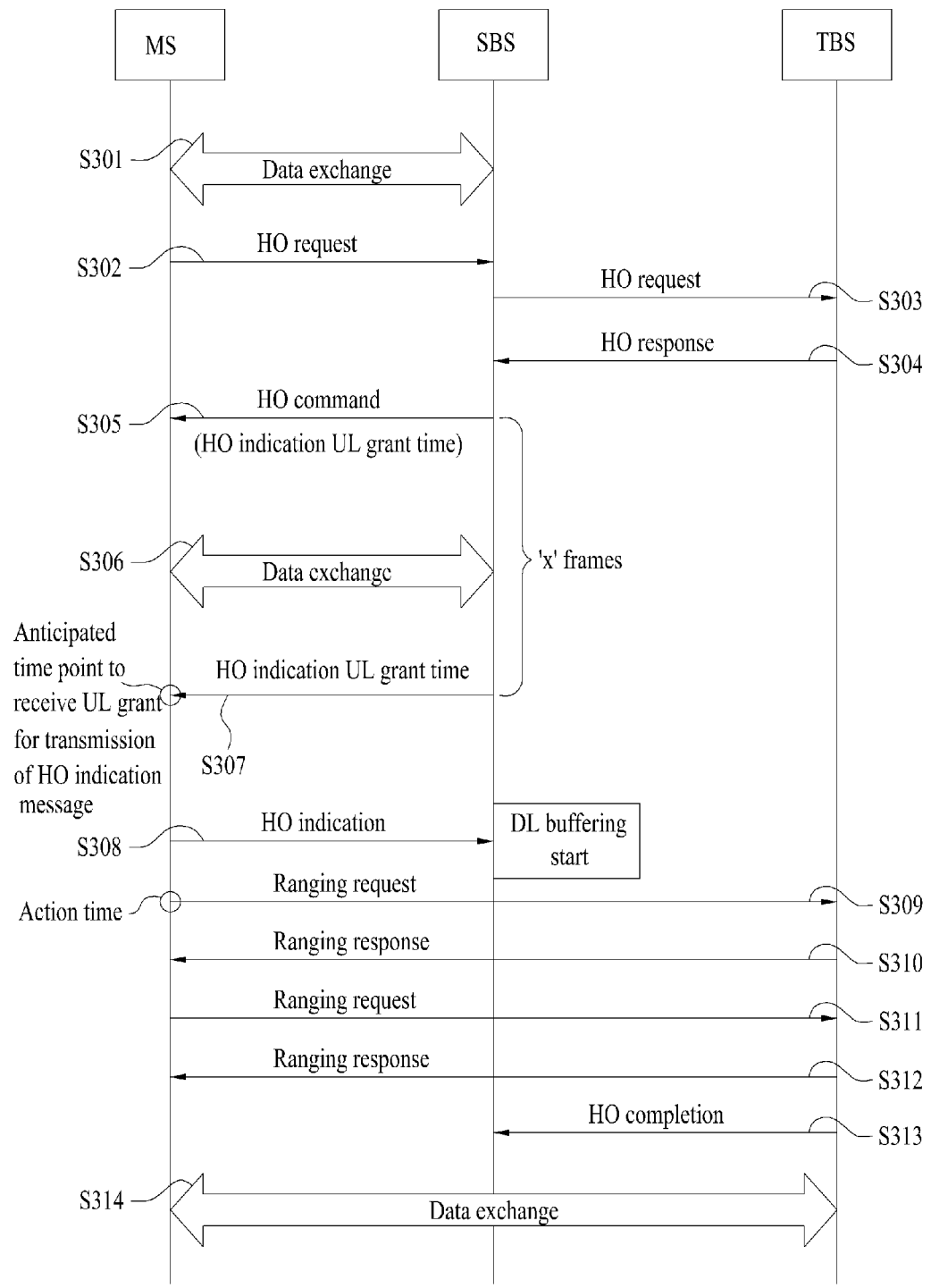
FIG. 3 shows an example of a handover procedure according to an embodiment of the present invention.

FIG. 3 shows an example of an HO procedure according to an embodiment of the present invention.

Referring to FIG. 3, while an MS and an SBS normally exchange data (step S301), the MS may transmit an HO request message to the SBS in order to perform HO (step S302).

The SBS may transmit the HO request message to a TBS, the TBS may transmit the HO request message to the SBS, and the TBS may transmit an HO response message as a response to the HO request message to the SBS (steps S303 and S304).

The SBS transmits an HO command (AAI_HO-CMD) message to the MS (step S305). In this case, since the SBS is aware of an action time, the SBS may inform the MS of information as to until when the MS can be continuously served by the SBS. As an example, the HO command message may include an HO indication UL grant time (HO-IND UL grant_time) (hereinafter, referred to as "grant time" for convenience) which indicates a time point at which UL grant information for transmission of an HO indication (AAI_HO-IND) message of the MS is to be transmitted. The grant time may be set in units of frames. Here, it is assumed that the grant time is set to 'x' frames (where x is a natural number greater than 1). The HO command message may further include action time information.

The MS may continue to be served by the SBS up until the grant time (step S306).

Next, if it is a time point indicated by the grant time (i.e., if x frames have elapsed), the SBS transmits UL grant information for transmission of the AAI_HO-IND message to the MS (step S307).

Upon receiving the UL grant information, the MS may transmit the AAI_HO-IND message through a UL resource indicated by the UL grant information (step S308).

Then the MS and the BS may start buffering for data to be transmitted thereby.

The MS may transmit a ranging request (AAI_RNG-REQ) message (or dedicated/contention-based CDMA ranging code) to the TBS (step S309). At this time, the HO request message may be transmitted at a time point indicated by the action time information included in the AAI_HO-CMD message received in step S305.

Next, the MS and the TBS may exchange a ranging response message and a ranging request message and perform an HO procedure through physical parameter correction, an authentication procedure, etc. (steps S310, S311, and S312). This process conforms to a general HO procedure, e.g., a procedure determined in IEEE 802.16m standard, and therefore, a detailed description thereof is omitted.

The TBS may transmit an HO complete message for informing the SBS that HO with the MS has completed to the SBS (step S313).

The MS and the TBS, which have successfully performed HO, may normally exchange data (step S314).

Second Embodiment

Meanwhile, according to another embodiment of the present invention, the MS may request the SBS to transmit UL grant information for transmission of an HO indication message. This is described with reference to FIG. 4.

Figure 4:
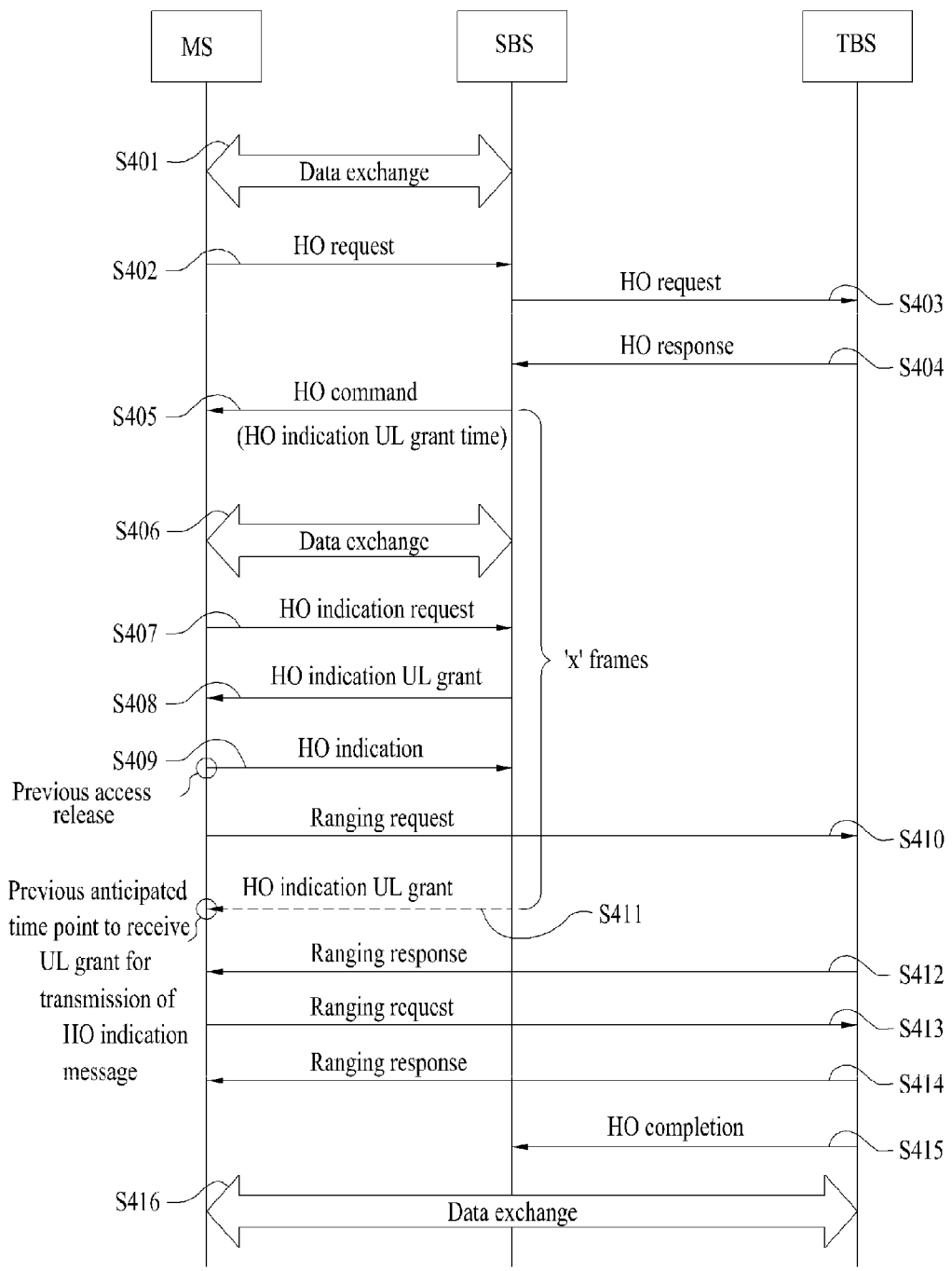
FIG. 4 shows an example of a handover procedure according to another embodiment of the present invention.

FIG. 4 shows an example of an HO procedure according to another embodiment of the present invention.

Since steps S401 to S406 of FIG. 4 are similar to steps S301 to S306 described with reference to FIG. 3, a repetitive description is omitted for simplicity of specification.

However, if the case occurs where the MS does not continue to communicate with the SBS until a grant time indicated through an HO command message in step S405, the MS may request the SBS to transmit UL grant information for transmission of an HO indication message (step S407). Such a request may be transmitted through a conventional Medium Access Control (MAC) message or a newly defined MAC message. Alternatively, the MS may request UL bandwidth for transmission of the HO indication message through a piggyback scheme while exchanging information with the SBS. Hereinafter, a request for UL grant information or UL bandwidth for transmitting the HO indication message, which is performed by the MS, will be referred to as an "HO indication request" and a MAC message used during the HO indication request will be referred to as an "HO indication request message".

If the MS performs an HO indication request before a time point indicated by a grant time, an action time or grant time of which the SBS previously informs the MS is disregarded.

According to the HO indication request of the MS, the SBS transmits UL grant information for transmission of the HO indication message to the MS even before the grant time (step S408).

The MS may transmit the HO indication message through a UL resource indicated by the received UL grant information (step S409). Then the MS and the SBS may perform buffering for data to be transmitted thereby.

Next, the MS may transmit a ranging request message to the TBS in order to perform HO to the TBS (step S410).

As described above, since the grant time included in the HO command message in step 405 is disregarded according to the HO indication request of the MS, the SBS may not transmit the UL grant information to the MS even if it is a time point indicated by an initial grant time (step S411).

The subsequent steps S412 to S416 are similar to steps S310 to S314 described with reference to FIG. 3, and therefore, a repetitive description is omitted.

Meanwhile, according to another aspect of this embodiment, the MS may request the SBS to change an HO execution time point through an HO indication request even in an HO circumstance through fast ranging. This is described with reference to FIG. 5.

Figure 5:
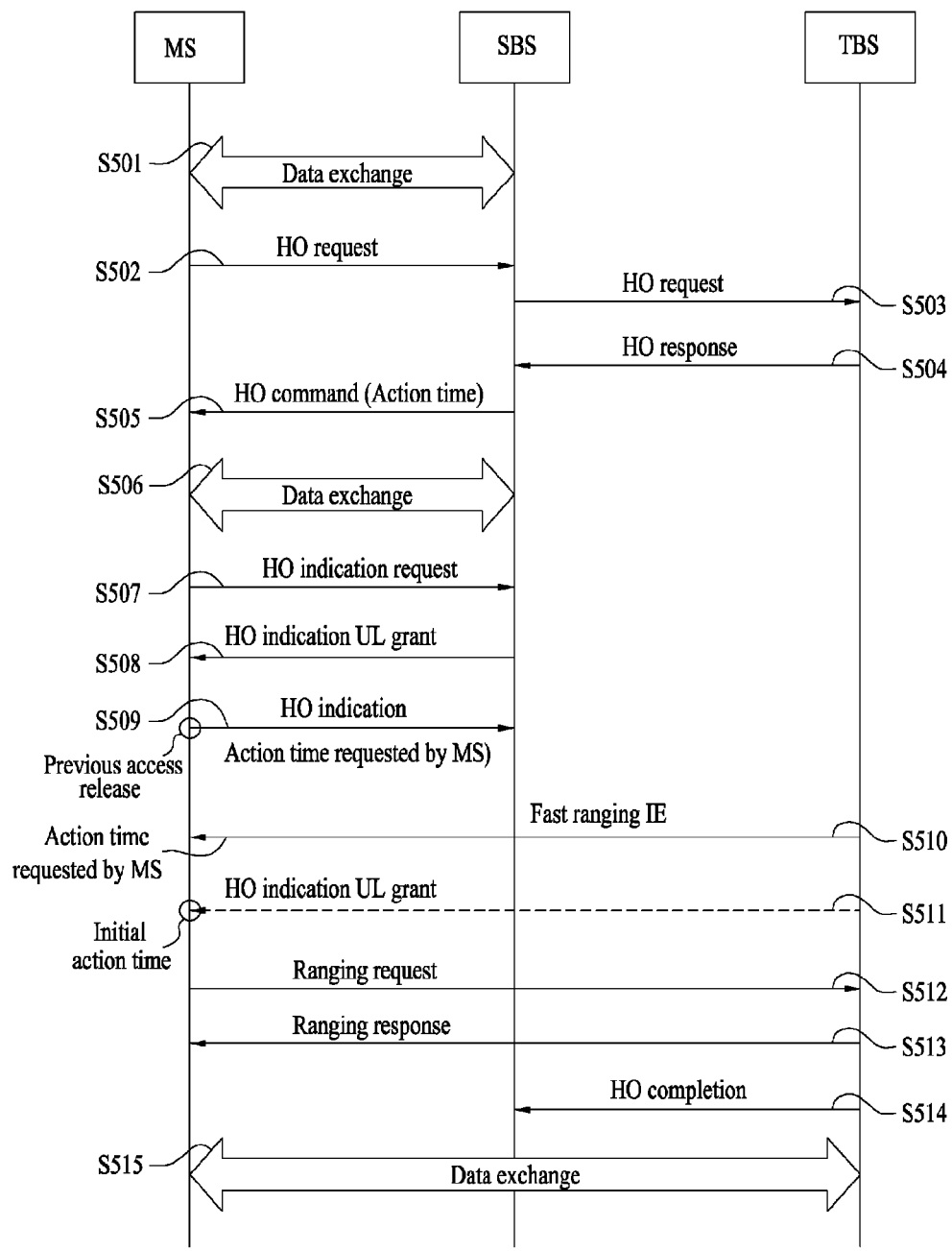
FIG. 5 shows an example of a handover procedure through fast ranging according to another embodiment of the present invention.

FIG. 5 shows an example of an HO procedure through fast ranging according to another embodiment of the present invention.

Since steps S501 to S509 of FIG. 5 are similar to steps S401 to S406 described with reference to FIG. 4, a repetitive description is omitted for simplicity of specification.

However, since the MS performs an HO indication request in order to previously transmit an HO indication message to the SBS, an action time, which is a time point at which a fast ranging IE is transmitted from the TBS, needs to be advanced. To this end, the MS may transmit an HO indication message including preferred action time information in step S509.

Upon receiving the HO indication message including the action time information, the SBS informs the TBS of the action time information and the TBS may transmit a fast ranging IE to the MS at a time point indicated by the action time information, requested by the MS (step S510).

Then a time point indicated by action time information included in an HO command message in step S505 is disregarded and the TBS may not transmit the fast ranging IE to the MS even at a corresponding time point (step S511).

Next, the MS may transmit a ranging request message to the TBS through a UL resource indicated by the fast ranging IE and the TBS may transmit a ranging response message to the MS (steps S512 and S513).

If an HO process is normally ended, the TBS may inform the SBS that the HO procedure has completed and the MS and the TBS may normally exchange data (steps S514 and S515).

If the TBS does not transmit the fast ranging IE to the MS at an action time preferred by the MS, the MS may perform contention-based ranging to a corresponding BS after a predetermined time. Even in this situation, a timer for MS waiting the fast ranging IE may be set to be shorter than a time indicated by initially allocated action time information. In the present invention, such a timer is referred to as a "fast ranging waiting timer".

Meanwhile, according to still another aspect of the present embodiment, the above-described HO indication request may be carried out in the form of transmitting a prescribed CDMA code. This is described with reference to FIG. 6.

Figure 6:
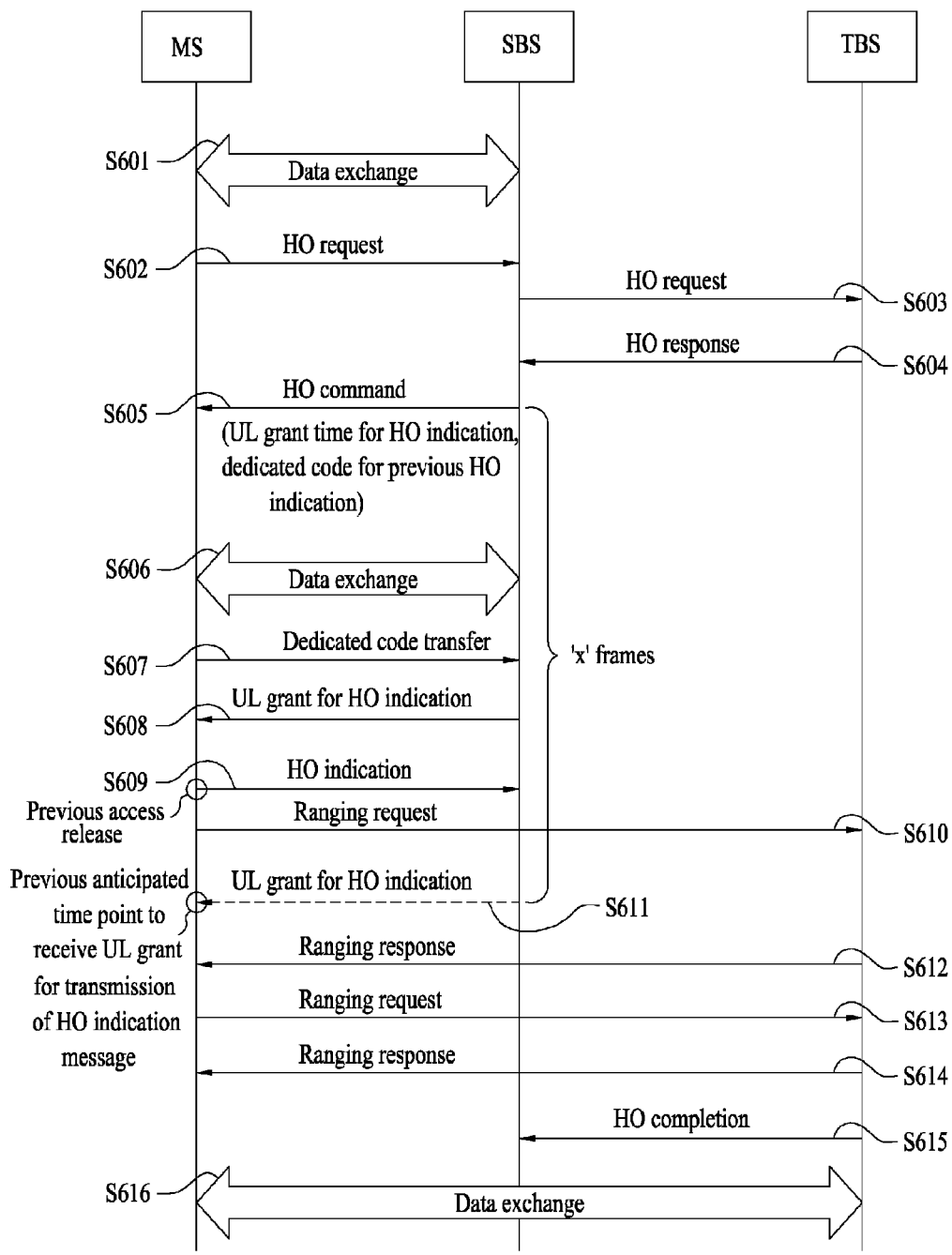
FIG. 6 shows an example of a handover procedure using a handover indication request through code transmission according to another embodiment of the present invention.

FIG. 6 shows an example of an HO procedure using an HO indication request through code transmission according to another embodiment of the present invention.

Since steps S601 to S604 of FIG. 6 are similar to steps S401 to S404 described with reference to FIG. 4, a repetitive description is omitted for simplicity of specification.

The SBS may transmit an HO command (AAI_HO-CMD) message including a grant time and including a CDMA code for an HO indication request to the MS (step S605).

The CDMA code for the HO indication request refers to a dedicated CDMA ranging code for a corresponding MS, which enables the MS to perform an HO indication request for requesting bandwidth capable of previously transmitting an HO indication message. The CDMA ranging code may be replaced with an orthogonal code.

Next, the MS may exchange data with the SBS up until a time point indicated by a grant time (step S606).

However, the case may occur where the HO indication message should be previously transmitted to perform HO due to a bad channel state of the MS before a time point indicated by a grant time. In this case, the MS may transmit a ranging code allocated through an HO command message to a ranging region of the SBS for the purpose of an HO indication request (step S607).

Upon receiving the ranging code, the SBS may determine which MS has performed the HO indication request through information of code allocated thereby the SBS when transmitting the HO command message. Meanwhile, the SBS may transmit UL grant information to the MS in order to allocate a UL resource of a next frame so that a corresponding MS can transmit the HO indication message (step S608).

The MS may transmit the HO indication message to the SBS through the UL resource indicated by the UL grant information and transmit a ranging request message to the TBS (step S609 and S610).

As described above, since the grant time included in the HO command message in step S605 is disregarded according to the HO indication request of the MS, the SBS may not transmit the UL grant information to the MS even at a time point indicated by an initial grant time (step S611).

The next processes conform to a general HO procedure and are similar to the previously described processes. Therefore, a detailed description thereof is omitted.

In the above procedure, a time point at which the SBS performs buffering for DL data to a corresponding MS may be a time point at which the dedicated ranging code is received or may be a time point at which the HO indication message is received.

HO Command Message

Hereinafter, a type of an HO command (AAI_HO-CMD) message which can be used in the above-described embodiments will be described.

The AAI_HO-CMD message includes information about candidate TBSs (i.e. candidate BSs) for fast HO. An MS may subjectively select the best candidate BS as a TBS and determine to perform HO. Examples of information about a candidate BS may include a preamble of each candidate BS and information as to degree of HO optimization support.

A detailed format of the AAI_HO-CMD message is described with reference to Table 1.

TABLE 1

| Syntax | Size (bit) | Notes |
|---|---|---|
| AAI_HO-CMD_Message_format( ) { | — | — |
| Management Message Type = 58 | 8 | — |
| Mode | 3 | 0b000: HO request0b001: MDHO/FBSS request0b010: MDHO/FBSS request0b011: MDHO/FBSS request0b100: MDHO/FBSS request0b101: MDHO/FBSS request0b111: MS HO request not recommended (BS in list unavailable) |
| UL Grant cycyle | 8 | This indicates a transmission cycle when UL grant information is cyclically transmitted to MS. Frame or subframe unit. |
| HO-IND UL grant time | 3 | This indicates a time point at which UL grant information for transmission of a handover indication message is transmitted from an SBS to an MS in a frame or subframe unit. |

Referring to Table 1, predetermined bits (e.g., 3 bits) are allocated to a grant time (HO-IND UL grant time) field and a maximum of 8 frames in length can be allocated up to an action time. The predetermined bits necessary for this field may be brought from reserved bits.

The MS can recognize, through the grant time field, when UL grant information for transmission of an HO indication message can be received and can continue to be served by the SBS until that time point. Next, the MS can perform buffering for UL data at a time point indicated by the grant time field. The buffered data may be transmitted to the TBS after HO completion.

The UL Grant cycyle field indicates a cycle when the SBS cyclically transmits UL grant information to the MS.

Third Embodiment

According to a further embodiment of the present invention, UL grant information for transmission of an HO indication message of an MS may be cyclically transmitted to the MS by an SBS. This is described with reference to FIG. 7.

Figure 7:
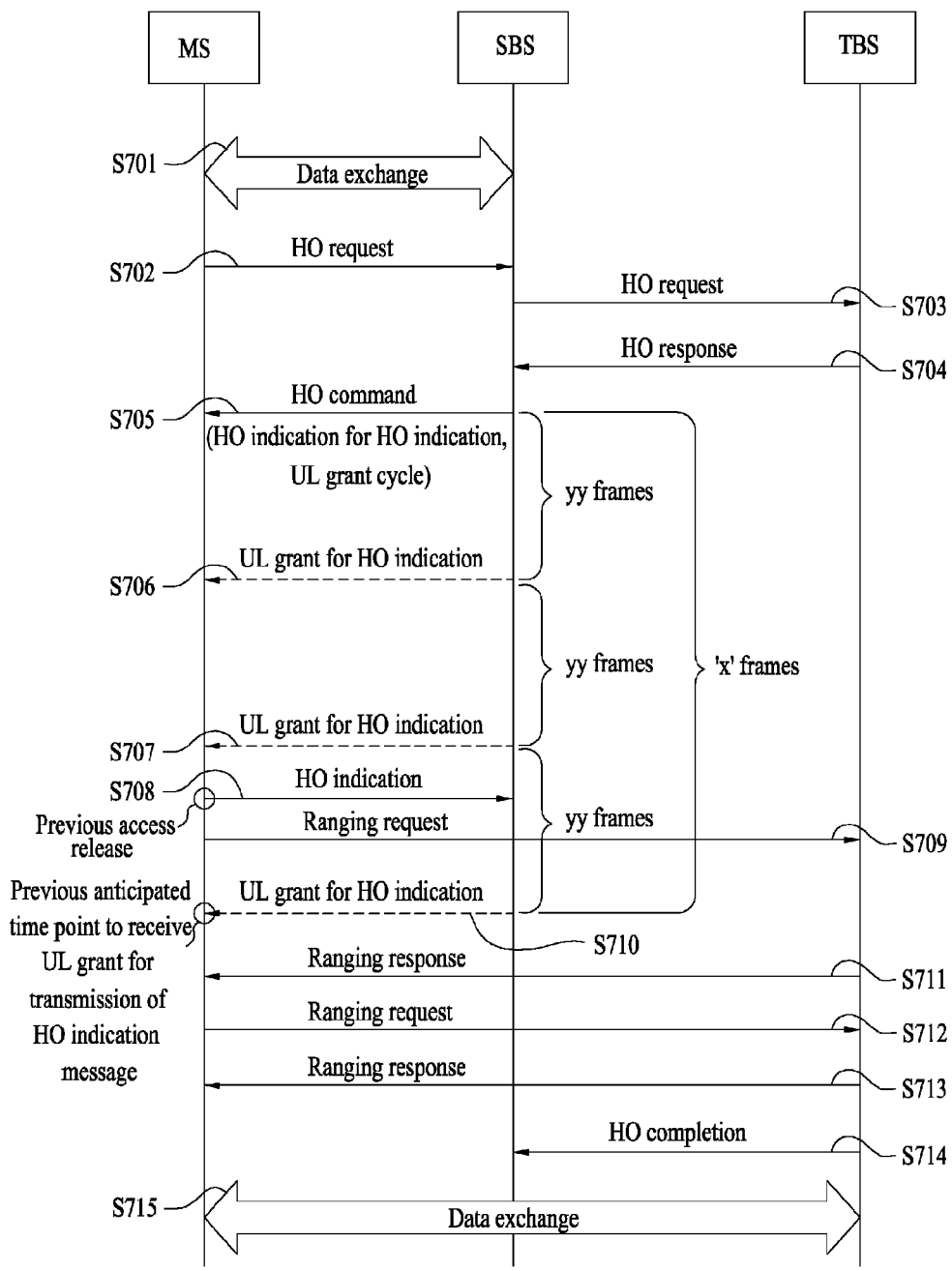
FIG. 7 shows an example of a handover procedure through cyclical uplink resource allocation according to a further embodiment of the present invention.

FIG. 7 shows an example of an HO procedure through cyclical UL resource allocation according to a further embodiment of the present invention.

Referring to FIG. 7, since steps S701 to S704 are similar to steps S401 to S406 described with reference to FIG. 4, a repetitive description is omitted for simplicity of specification.

An SBS may transmit an HO command (AAI_HO-CMD) message including a grant time and including cycle information indicating a cycle at which UL grant information is transmitted, (hereinafter, referred to as a "UL grant cycle") to an MS (step S705). Here, the UL grant cycle refers to a cycle at which the SBS transmits the UL grant information to the MS so that the MS can transmit an HO indication message in the case where the MS should previously transmit the HO indication message to the SBS for some reasons (e.g., deterioration of a channel environment) before a time point indicated by a grant time.

The UL grant cycle may be set in units of frames. The SBS may transmit the UL grant information to the MS at every UL grant cycle up until the grant time (steps S706 and S707).

If a circumstance occurs in which the MS should previously transmit the HO indication message while exchanging data with the SBS before a time point indicated by the grant time, the MS may transmit the HO indication message through a UL resource indicated by UL grant information which is received most recently or UL grant information which is first transmitted after the occurrence of such a circumstance (step S708).

The MS may transmit a ranging request message to a TBS in order to perform HO (step S709).

Since the grant time included in the HO command message in step S705 is disregarded according to reception of the HO indication request from the MS, the SBS may not transmit the UL grant information to the MS even at a next UL grant cycle or at a time point indicated by an initial grant time (step S710).

The next processes conform to a general HO procedure and are similar to the previously described processes. Therefore, a detailed description thereof is omitted.

In the above procedure, a time point at which the SBS performs buffering for DL data to a corresponding MS may be a time point at which a dedicated ranging code is received or may be a time point at which the HO indication message is received.

Structure of MS and BS

As still another embodiment of the present invention, an MS and a BS (FBS or MBS) through which the above-described embodiments can be implemented are described.

The MS may operate as a transmitter in UL and as a receiver in DL. The BS may operate as a receiver in UL and as a transmitter in DL. In other words, the MS and the BS may include a transmitter and a receiver to transmit information or data.

The transmitter and the receiver may include processors, modules, parts, and/or means, for carrying out the embodiments of the present invention. In particular, the transmitter and the receiver may include a module (means) for encrypting messages, a module for interpreting the encrypted messages, and an antenna for transmitting and receiving message. An example of the transmitter and the receiver is described with reference to FIG. 8.

Figure 8:
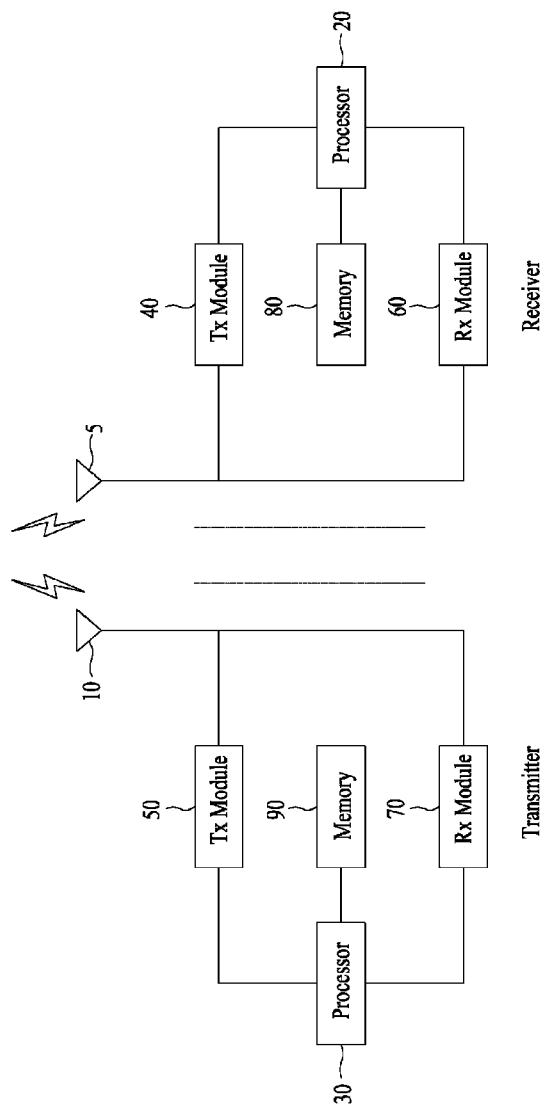
FIG. 8 is a block diagram showing an example of the structure of a transmitter and a receiver according to a further embodiment of the present invention.

FIG. 8 is a block diagram showing an example of the structure of a transmitter and a receiver according to a further embodiment of the present invention.

Referring to FIG. 8, a left side shows the structure of the transmitter and a right side shows the structure of the receiver. The receiver and the transmitter may include antennas 5 and 10, processors 20 and 30, transmission (Tx) modules 40 and 50, reception (Rx) modules 60 and 70, and memories 80 and 90, respectively. The respective elements may perform corresponding functions. Hereinafter, each element will be described in more detail.

The antennas 5 and 10 transmit signals generated from the Tx modules 40 and 50 to the exterior and transfer radio signals received from the exterior to the Rx modules 60 and 70. If a MIMO function is supported, two or more antennas may be included in each of the antennas 5 and 10.

The antenna, Tx module, and Rx module may constitute a Radio Frequency (RF) module.

The processors 20 and 30 typically control overall operation of the MS. For example, the processors 20 and 30 may control a controller function for carrying out the above-described embodiments of the present invention, a MAC frame variable control function based on service characteristics and propagation environments, an HO function, an authentication and encryption function, and the like.

Especially, the processor of the MS may determine whether to perform HO according to a channel circumstance by controlling the RF module and may transmit an HO request message to an SBS. The processor of the MS may receive information about one or more candidate BSs from the SBS and an HO command message including grant time information. In this case, the HO command message may additionally include at least one of a CDMA code for an HO indication request and a UL grant cycle.

The processor of the MS may select a TBS to which HO is to be performed among one or more candidate BSs using information included in the HO command message. The processor of the MS may control the RF module so that UL grant information for transmission of the HO indication message is received at a time point indicated by the grant time information. The processor of the MS may perform a control function for transmitting the HO indication message to the SBS through a UL resource indicated by the UL grant information. Next, the processor of the MS may perform a control function for performing an HO procedure by exchanging a ranging request message and a ranging response message with the TBS.

Meanwhile, the case may occur where the HO indication message should be previously transmitted due to deterioration of a channel state before a time point indicated by the grant time information. In this case, the processor of the MS may perform an HO indication request to the SBS using a CDMA code for an HO indication request if it is present or using a piggyback header. If the HO command message includes a UL grant cycle in the same situation, the processor may perform a control function for transmitting the HO indication message to the SBS using the UL grant information which is cyclically received before and after a time point at which the situation occurs.

In case of a fast ranging procedure, the processor of the MS may transmit the HO indication message including preferred action time information in the above situation.

The processor of the MS may control the memory 80 to store UL data to be transmitted after receiving the HO indication message.

The processor of the SBS may acquire information about candidate BSs by exchanging an HO request message and an HO response message with at least one candidate BS when there is an HO request from the MS. The processor of the SBS may include, in the HO command message, information about one or more candidate BSs and grant time information indicating a time point at which UL grant information for transmission of the HO indication message of the MS is transmitted and may perform a control function for transmitting such information to the MS.

In this case, the processor may additionally include at least one of a CDMA code for an HO indication request and a UL grant cycle in the HO command message.

Next, the processor of the SBS may allocate a UL resource so that the MS can transmit the HO indication message at a time point indicated by the grant time information and may inform the MS of the allocated UL resource through the UL grant information. Upon receiving the HO indication message from the MS through the allocated UL resource, the processor of the BS may start buffering for DL data to a corresponding MS. In this case, the buffered data may be stored in the memory 90.

Upon receiving the HO indication request from the MS, the processor of the BS may allocate a UL resource for transmission of the HO indication message to the MS and may cyclically allocate the UL resource to the MS without the HO indication request.

The Tx modules 40 and 50 may perform predetermined coding and modulation of data which is scheduled from the processors 20 and 30 and is to be transmitted to the outside and then may transfer the coded and modulated data to the antenna 10.

The Rx modules 60 and 70 may perform decoding and demodulation of radio signals received through the antennas 5 and 10 from the outside, restore the signals into original data, and transfer the restored data to the processors 20 and 30.

The memories 80 and 90 may store programs required for processing and control of the processors 20 and 30 and temporarily store input and output data (sleep mode information etc. according to reference synchronization information). Each of the memories 80 and 90 may include at least one storage medium among a flash memory-type storage medium, a hard disk-type storage medium, a multimedia card micro-type storage medium, a card-type memory (e.g. SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc.

Meanwhile, the BS may perform a controller function for carrying out the above-described embodiments of the present invention, Orthogonal Frequency Division Multiple Access (OFDMA) packet scheduling, a Time Division Duplex (TDD) packet scheduling and channel multiplexing function, a MAC frame variable control function based on service characteristics and propagation environments, a fast traffic real-time control function, an HO function, an authentication and encryption function, a packet modulation and demodulation function for data transmission, a fast packet channel coding function, and a real-time modem control function, through at least one of the above-described modules or may further include additional means, modules, or parts, for performing these functions.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. Also, claims which are not explicitly dependent on each other can be combined to provide an embodiment or new claims can be added through amendment after this application is filed.

INDUSTRIAL APPLICABILITY

Although the above-described HO execution method and the MS structure therefor have described focusing on an IEEE 802.16m system, they are applicable to a variety of mobile communication systems for performing HO in addition to IEEE 802.xx systems.

What is claimed is:

1. A method for performing handover in a wireless communication system, the method comprising:
receiving, by a mobile station from a serving base station, a handover command message including:
information related to a disconnect time,
wherein the information related to the disconnect time is configured in units of frames,
wherein the disconnect time is a time for the mobile station to disconnect from the serving base station, and
wherein the disconnect time indicates a time point at which the serving base station stops sending downlink data to the mobile station and stops an uplink resource allocation for the mobile station, and
an action time for the mobile station to transmit a ranging request to a target base station;
if the mobile station cannot maintain a connection with the serving base station until the disconnect time, transmitting, by the mobile station to the serving base station, a handover indication message for disconnecting the mobile station from the serving base station earlier than the disconnect time; and
transmitting, by the mobile station to the target base station, the ranging request based on a dedicated ranging code at the action time.

2. The method of claim 1, further comprising:
determining, by the mobile station, the disconnect time based on the handover command message;
if the mobile station cannot maintain the connection with the serving base station until the disconnect time, buffering uplink data within the mobile station without transmitting the uplink data before the disconnect time; and
receiving, by the mobile station from the target base station, downlink data which has been buffered in the serving base station after the disconnect time.

3. The method of claim 1, further comprising:
receiving, by the mobile station from the serving base station, first uplink allocation information for transmitting the handover indication message; and
cyclically receiving, by the mobile station from the serving base station, second uplink resource allocation information for transmitting the handover indication message,
wherein the handover command message includes second time information indicating a cycle at which the second uplink resource allocation information is transmitted, and
wherein the handover indication message is transmitted by the mobile station through an uplink resource indicated by the second uplink resource allocation information if the mobile station can maintain the connection with the serving base station until the disconnect time.

4. The method of claim 1, further comprising:
if the mobile station cannot maintain the connection with the serving base station until the disconnect time,
transmitting, to the serving base station, a request for uplink grant information for transmitting the handover indication message before the disconnect time; and
receiving the uplink grant information from the serving base station in response to the request for the uplink grant information,
wherein the handover indication message is transmitted by the mobile station to the serving base station through an uplink resource indicated by the uplink grant information.

5. The method of claim 4, wherein the request for the uplink grant information is transmitted via a Medium Access Control (MAC) message or a piggyback header.

6. The method of claim 4,
wherein the handover command message further includes a ranging code for requesting the uplink grant information, and
wherein the request for the uplink grant information includes the ranging code.

7. The method of claim 4,
wherein the handover indication message includes a modified action time information requested by the mobile station, the method further comprising:
receiving a fast ranging information element from the target base station at a time point indicated by the modified action time information.

8. A method supporting handover in a wireless communication system, the method comprising:
transmitting, by a serving base station to a mobile station, a handover command message including:
information related to a disconnect time,
wherein the information related to the disconnect time is configured in units of frames,
wherein the disconnect time is a time for the mobile station to disconnect from the serving base station, and
wherein the disconnect time indicates a time point at which the serving base station stops sending downlink data to the mobile station and stops an uplink resource allocation, and
an action time for the mobile station to transmit a ranging request to a target base station; and
if a connection with the mobile station cannot be maintained until the disconnect time,
receiving, by the serving base station from the mobile station, a handover indication message for disconnecting from the mobile station from the serving base station earlier than the disconnect time; and
buffering, by the serving base station, downlink data for the mobile station without transmitting the downlink data to the mobile station before the disconnect time.

9. The method of claim 8, wherein a network reentry to the target base station is performed by the mobile station at the action time.

10. The method of claim 8, further comprising:
transmitting, by the serving base station to the mobile station, first uplink allocation information for transmitting the handover indication message; and
cyclically transmitting, by the serving base station to the mobile station, second uplink resource allocation information for a transmission of the handover indication message by the mobile station,
wherein the handover command message includes second time information indicating a cycle at which the second uplink resource allocation information is transmitted, and
wherein the transmission of the handover indication message by the mobile station is performed through an uplink resource indicated by the second uplink resource allocation information if the mobile station can maintain the connection with the serving base station until the disconnect time.

11. The method of claim 10, wherein the cyclical transmission of the second uplink resource allocation information is stopped when the handover indication message is received through a resource indicated by the second uplink resource allocation information.

12. The method of claim 8, further comprising:
if the mobile station cannot maintain the connection with the serving base station until the disconnect time,
receiving a request from the mobile station uplink grant information for transmitting the handover indication message before the disconnect time; and
transmitting the uplink grant information to the mobile station as a response to the request for the uplink grant information,
wherein the handover indication message is transmitted by the mobile station through an uplink resource indicated by the uplink grant information.

13. The method of claim 12, wherein the request for the uplink grant information is received via a Medium Access Control (MAC) message or a piggyback header.

14. The method of claim 12,
wherein the handover command message further includes a ranging code for requesting the uplink grant information, and
wherein the request for the uplink grant information includes the ranging code.

15. The method of claim 14,
wherein the handover indication message includes modified action time information requested by the mobile station, the method further comprising:
transmitting the modified action time information to the target base station.

16. A mobile station, comprising:
a Radio Frequency (RF) circuit configured to transmit and receive radio signals to and from the outside; and
a processor operatively connected to the RF circuit and configured to:
receive a handover command message from a serving base station, the handover command message including:
information related to a disconnect time,
wherein the information related to the disconnect time is configured in units of frames,
wherein the disconnect time is a time for the mobile station to disconnect from the serving base station, and
wherein the disconnect time indicates a time point at which the serving base station stops sending downlink data to the mobile station and stops an uplink resource allocation for the mobile station, and
an action time for the mobile station to transmit a ranging request to a target base station,
if the mobile station cannot maintain a connection with the serving base station until the disconnect time,
transmit to the serving base station a handover indication message for disconnecting the mobile station from the serving base station earlier than the disconnect time, and
transmit the ranging request to the target base station based on a dedicated ranging code at the action time.

17. The mobile station of claim 16,
wherein the processor is configured to
receive, from the serving base station, first uplink allocation information for transmitting the handover indication message, and
cyclically receive, from the serving base station, second uplink resource allocation information for transmitting the handover indication message,
wherein the handover command message includes second time information indicating a cycle at which the second uplink resource allocation information is transmitted, and
wherein the handover indication message is transmitted by the mobile station through an uplink resource indicated by the second uplink resource allocation information if the mobile station can maintain the connection with the serving base station until the disconnect time.

18. The mobile station of claim 16,
wherein, if the mobile station cannot maintain the connection with the serving base station until the disconnect time, the processor is configured to
request, from the serving base station, uplink grant information for transmitting the handover indication message before the disconnect time; and
receive the uplink grant information from the serving base station in response to the request for the uplink grant information,
wherein the handover indication message is transmitted by the mobile station to the serving base station through an uplink resource indicated by the uplink grant information.

19. The mobile station of claim 18, wherein the request for the uplink grant information is transmitted via a Medium Access Control (MAC) message or a piggyback header.

20. The mobile station of claim 18,
wherein the handover command message further includes a ranging code for requesting the uplink grant information, and
wherein the request for the uplink grant information includes the ranging code.

* * * * *